United States Patent [19]

Forkel

[11] 4,172,510
[45] Oct. 30, 1979

[54] TORSIONAL VIBRATION DAMPER

[76] Inventor: Dirk O. Forkel, Eichenweg 18, 852 Erlangen, Fed. Rep. of Germany, 09131

[21] Appl. No.: 831,468

[22] Filed: Sep. 8, 1977

[30] Foreign Application Priority Data

Sep. 10, 1976 [DE] Fed. Rep. of Germany ....... 2640752

[51] Int. Cl.² ............................................. F16F 15/12
[52] U.S. Cl. ...................................... 188/1 B; 74/574; 308/238; 308/DIG. 8
[58] Field of Search .......................... 188/1 B; 74/574; 92/58 B; 308/238, 239, DIG. 8

[56] References Cited

U.S. PATENT DOCUMENTS

| 1,787,810 | 1/1931 | Bigelow et al. | 308/238 |
| 2,661,915 | 12/1953 | O'Connor | 188/1 B |
| 3,491,857 | 1/1970 | Reed | 188/1 B |
| 3,677,879 | 7/1972 | D'Andrea | 308/DIG. 8 |
| 3,823,619 | 7/1974 | Shotwell | 188/1 B |
| 3,908,054 | 9/1975 | Ito | 308/238 |
| 3,930,691 | 1/1976 | Greene | 308/239 |
| 4,058,027 | 11/1977 | Webb | 192/58 B |

FOREIGN PATENT DOCUMENTS

| 2145610 | 3/1973 | Fed. Rep. of Germany | 188/1 B |
| 1209357 | 10/1970 | United Kingdom | 188/1 B |

*Primary Examiner*—Edward R. Kazenske
*Attorney, Agent, or Firm*—Sprung, Felfe, Horn, Lynch & Kramer

[57] ABSTRACT

A torsional vibration damper comprises an internal flange body and an external inertial body each having a plurality of intermeshing damper disks fastened thereto along a margin and defining there between interstitial spaces filled with a highly viscous liquid and sealed off with resilient material. The damper disks of at least one of the flange body and the inertial body have lamins which are offset in a cuplike manner at the fastening margin in accordance the desired spacing.

13 Claims, 11 Drawing Figures

TORSIONAL VIBRATION DAMPER

BACKGROUND OF THE INVENTION

The invention relates to a torsional vibration damper operating with a viscous friction medium for limiting the vibration excursions and hence for limiting the stress especially on crankshafts in internal combustion engines. Such vibration dampers are known in a variety of types, and consist basically of a flange body rigidly affixed to the shaft and an inertial body rotatably or resiliently mounted thereon, which forms with corresponding surfaces of the flange body narrow interstices which are filled with a highly viscous liquid. The relative movements which occur between the flange body and the inertial body acting as the inert mass in the case of torsional vibrations result in high shearing forces in the interstices and thus produce the desired damping action.

Depending on the arrangement of the inertial body, a distinction can be made between dampers having an internal torsional mass, in which the flange body is in the form of a casing and completely envelops the inertial ring, and those having an external torsional mass in which seals are necessary between the flange body and the inertial body enveloping the interstices.

Although the last-mentioned embodiment using an external inertial mass would have obvious advantages, consisting in the greatly reduced solid mass of the flange body due to the elimination of the housing and in the accessibility of the inertial body, only the fully enclosed design with its simple construction has hitherto been adopted in practice. Nevertheless, this construction has a number of weaknesses, which are manifesting themselves more and more unpleasantly especially in the case of engines subject to greater stress.

Some of the particular disadvantages are the limitation of the interstitial surface area, which is given by the surface area of the inertial ring, and, as a result thereof, the very narrow interstices which are unavoidable if optimum coupling is to be achieved with the oil viscosities available and, as an additional consequence thereof, the very small volume of the viscous friction medium, in which the entire work of the damper must be transformed into heat.

As it is known, between the above-named three magnitudes, at a given viscosity and a given diameter, the coupling is proportional to the interstitial surface area and inversely proportional to the width of the interstices, while the volume corresponds to the product of the two magnitudes. Thus, for example, a doubling of the interstice surface area over conventional dampers would permit twice the interstice width and result in four times the working volume.

The above-mentioned disadvantages are all thus inter-related and require not only a high surface quality and precision of form, but they also easily result in thermal and mechanical overstressing of the silicone oils used and thus to the ruination of the damper.

Furthermore, the internal pressure occurring during operation as a result of the temperature rise undesirably deforms the housing, resulting in a reduction of the damping action, and also resulting in interference and wearing of the inertial ring against the casing. Another problem is the very precise guidance of the inertial ring by means of the conventional friction bearing which is endangered, especially at high loads and upon the occurrence of axial vibrations, due to the poor lubricating properties of the silicone oils used and the relatively narrow bearing clearance in which the silicone oils might be stressed beyond their shear strength.

The fact that no practical solution has yet been found for a viscosity damper with an external inertial mass is evidently because in this case not are only the above-mentioned disadvantages of the enclosed construction eliminated, but also additional problems have to be solved, which are the result of the additionally required seal between the flange body and the torsional body, and of additional soild sealing surfaces between the individual parts of the two bodies, in view of the considerable creeping ability (low surface tension) of the silicone oils used and the internal pressures that occur. Furthermore, for the practical embodiment, there is the very important problem of finding for this basically more expensive damper construction consisting of more parts, a design which will permit competitively inexpensive manufacture along with no greater external dimensions.

Thus, solutions have been proposed in which, instead of friction seals which are unusable in sustained operation, seals of resilient material are proposed, which are under bias or are vulcanized on, and at the same time are to provide for the precise guidance of the flywheel. Such a construction (described for example in German Auslegeschrift 1295287), however, has the disadvantage that, although the radial and axial rigidity are adequate, the necessary movement in the tangential direction upon the occurrence of torsional vibrations is made possible only by sliding or by severe deformations, both of which would result in difficulties in sustained operation. In another proposal made in German Offenlegungsschrift 2362128, this problem is not solved, either, because in the case of the rubber rings installed by vulcanization, the same comments apply on account of the little amount of space available, while in the case of the likewise proposed friction bearings, a long life of the O-rings cannot be achieved. In short, therefore, the proposed solutions that have become known for the combined mounting in bearings and sealing of the inertial body against the flange body have the disadvantage that they are unable to satisfy the requirements as to greater precision and accordingly rigidity in the radial and axial directions, combined with sufficiently great elasticity in the circumferential direction, and that they furthermore do not have sufficient volume to accommodate the deforming work that occurs in sustained operation.

In addition, no provision is made for the prevention of a rise in the internal pressure when the damper becomes heated, which would be harmful to the seals themselves, or for the protection of the seals against it.

As regards the tight seal between the individual parts of the damper to be mounted, an embodiment in accordance with German Auslegeschrift 1295287 does appear to be feasible, but in this case the interstitial surface area is not greater than it is in the case of conventional enclosed damper constructions. On the other hand, the arrangement shown in German Offenlegungsschrift 2362128 of a plurality of intermeshing disks and intermediate rings permits a certain enlargement of the total interstitial surface area (although it can hardly be utilized at the given external dimensions of the damper due to the division called for here, into an inertial mass part and a damping part), but it achieves this at the cost of the disadvantage of four flat seals per pair of lamins or of correspondingly precisely machined sealing surfaces, which in either case involves higher manufacturing costs.

SUMMARY OF THE INVENTION

It is the object of the invention, therefore, to avoid both the above-mentioned disadvantages of conventional viscosity dampers with internal inertial mass and those of the hitherto disclosed proposals for the construction of dampers with external inertial mass.

This object is achieved in accordance with the invention in a torsional vibration damper in that the flange body and/or the inertial body bears, as damping disks, lamins which are offset at the point at which they are fastened together, to a degree depending on the desired spacing, for the achievement of greater rigidity as well as better thermal condition, and which are made so thin, relatively, that their thickness amounts to no more than five times the interstice width, and preferably to as little as twice the interstice width. With a sufficient number of such thin lamins, which are preferably stamped and pressed from sheet metal, the decisive increase in the interstitial surface area can be achieved in a very economical manner, with much lower accuracy requirements, and without increasing the dimensions of the torsional vibration damper.

The lamins lying outwardly in the axial direction and most severely offset desirably have on their cylindrical or conical portion the resilient, combined bearing and sealing rings, which thus are fastened on the one hand to the flange body and on the other hand lie within an overlapping sheet metal cap on the inertial body and thus support the latter.

In another embodiment, the above-mentioned sheet metal caps can extend upwardly over the face of the inertial body and can have a cylindrical margin overlapping the latter at its outside diameter. The fastening of the sheet metal caps to the inertial body is performed in the vicinity of the outside diameter, in which case a simplification of manufacture and sealing is accomplished especially when the two sheet metal caps abut one another in the vicinity of the center plane of the inertial body and make necessary only a single seal and welding seam, respectively. The sheet metal caps can advantageously be of such dimensions on their face sides and can be membrane-like construction such that, in the event of a temperature-related change in the volume of the damping liquid, they can yield slightly axially at the inside diameter (on account of the given resilience of the bearing), and this keeps the pressure rise within the damper low.

In another embodiment, the wide, resilient bearing and sealing rings are attached, not at their outside diameter, but at their inside diameter, to a correspondingly shaped portion of the flange body. In this case they bear the inertial body directly at corresponding surfaces, without the use of overlapping caps, the end plates of the inertial body being able to be broadened at their inside diameter for support on the bearing ring. In this embodiment, the volume compensation is best made possible by annular sheet metal membranes mounted on the face of the inertial body, being welded in place, for example, by two annular welds, and the membranes communicating with the interior of the damper through a bore.

In another embodiment which is suited especially to smaller dampers manufactured in large numbers, the lamins are situated in an annular chamber defined at its outside diameter by the inertial body and at its inside diameter by the flange body, and they are fastened alternately to the inertial body and to the flange body, the lamins of each of the two groups being identical. The bend at the fastening edge serves not only to establish the spacing between the lamins and to stiffen them, but also for the better fastening of the lamins. The individual lamins can also be made in two parts for manufacturing reasons, the two portions, e.g., the cylindrical and the flat portions, being brazed together, for example. The group of lamins fastened to the inertial body (outer lamins) can, under certain circumstances, be made of thicker metal, and can be assembled with the aid of annular spacers.

When the damper is composed of sets of identical lamins, it will be desirable for economical reasons to have a limited selection of diameter matchings, and to achieve the required interstitial surface area by selecting the correct number of lamins, the space that remains free being filled out by inertial mass.

The lamins are pushed in axially from one side and additionally assured especially against rotation, which can be accomplished by welding them or soldering them in place or by keying them in place, for example by means of axial grooves with lamins designed to match them. Particularly in the case of relatively great quantities, it may be advantageous to assemble the groups of lamins together outside of the damper in a jig and fasten them by brazing, for example, and then to fasten the complete set of lamins in the vibration damper.

In this embodiment, too, the resilient bearing and sealing rings are attached at their outer side to an inner surface of the flange body and at their inner side to the cylindrical or slightly conical portion of an over-lapping sheet metal cap, or the bearing rings are fastened to an outside diameter of the bearing flange and support the inertial body directly without the above-mentioned caps. In either case the support and sealing can be either symmetrical with the center plane of the damper or one-sided, in which case a second seal must be provided between the flange body and the inertial body. Since this seal does not have to transfer any forces, it is desirable for it to be given such resiliency that it will permit a compensation of volume without substantial build-up of pressure as the damper becomes heated.

In all of the embodiments the problem of the maintenance-free and wear-free mounting or guidance of the inertial body and of the sealing of the interstitial space is solved in accordance with the invention in that at least two resilient bearing and sealing rings of approximately rectangular cross section are provided. To minimize the specific stress and heating in these rings, they are made as large as possible and they extend over the entire structurally available width. At the same time it is possible either to make the ring arrangement symmetrical with the center plane such that both rings serve bearing and sealing functions, or to choose an asymmetrical arrangement in which substantially only one of the rings performs the bearing function, being made wider accordingly, while the other serves virtually naught but sealing purposes and is made of an especially resilient material.

The bearing and sealing rings are furthermore arranged such that the required greater stiffness for the radial and axial guidance of the inertial body is achieved without impairing the resiliency in the circumferential direction. This can be accomplished by a slight tilting of the bearing and sealing ring, i.e., by providing it with conical surfaces. This tilting brings it about that, in the event of an axial stress, a pressure component is created which considerably increases the axial stiffness by the sine of the cone angle, whereas otherwise the desired stiffness in the radial direction is reduced negligibly by the cosine of the cone angle. In the case of rubber rings which are not attached by vulcanization, this tilting additionally offers the advantage of making it possible to assemble the damper in the axial direction, in a simple manner.

Furthermore, especially in the case of rubber rings attached by vulcanization, there exists the possibility of lengthening the bearing and sealing ring radially by means of a flange-like extension, this portion of the bearing ring then being located between opposite radial surfaces of the flange body and inertial body and being stressed compressively in the case of axial displacement, thereby considerably increasing the axial stiffness in a desirable manner.

Finally, the rubber rings themselves can also be made anisotropic by causing them to behave softly in relation to shearing forces in the circumferential direction, but stiffly in relation to forces in the axial and radial direction. This can be accomplished, for example, by constructing the ring in laminations of different hardness, the interfaces between softer and harder material being located always approximately in planes passing through the axis, or, in other words, always approximately radially as one views the rubber ring in the direction of its axis. Such reinforcements or inserts impede movement in the case of axial stress, and also, to a certain extent, in the case of radial stress, whereas in the case of tangential stress the desired resilience in the circumferential direction remains virtually unimpaired. A design which lends itself to easy manufacture consists in the fact that the numerous radially disposed reinforcements which are embedded in the bearing and sealing ring are not inserted individually but are held together in a meander-like band, the bends being weakened such that no great bending moments can occur at them. Without this weakening, which can also be in the form of scoring for breakage, the resilience would be undesirably reduced in the case of tangential stress.

BRIEF DESCRIPTION OF THE DRAWINGS

The invention will be described below with the aid of a number of embodiments represented diagrammatically in the drawings, FIGS. 1 to 11, wherein.

DETAILED DESCRIPTION OF THE INVENTION

Figure 1:
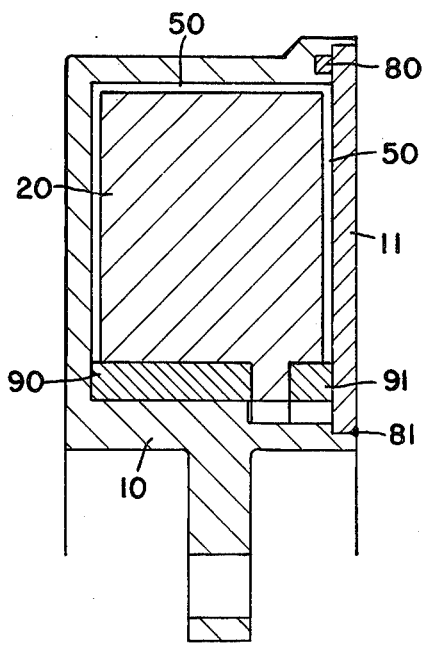
FIG. 1 shows for comparison a conventional vibration damper with an internal inertial mass.

In FIG. 1 there is shown for comparative purposes a vibration damper of conventional construction in which the flange body 10 is in the form of a casing entirely surrounding the inertial ring 20. Between the two there is the interstitial space 50 which is only a few tenths of a millimeter thick and is filled with viscous friction liquid and in which the damping work is converted to heat. The annular cover 11 hermetically seals the housing with a solid gasket 80 or with a weld 81. The precise guidance of the inertial ring in the casing is provided by the friction sleeve bearing 90 and the axial bearing ring 91.

Figure 2:
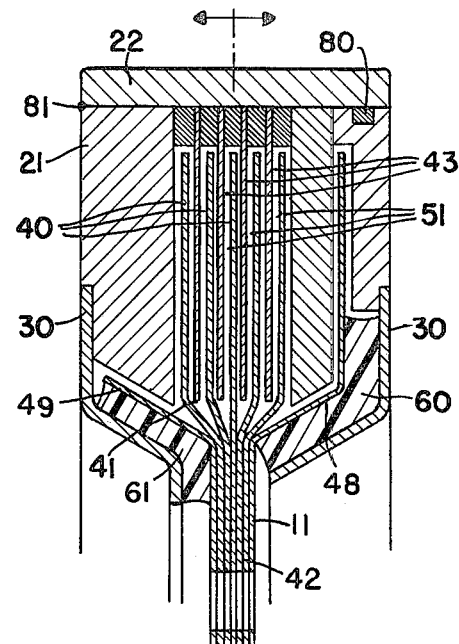
FIG. 2 shows a laminated damper having lamins held together at their fastening margin and sheet metal caps overreaching the bearing rings.

FIG. 2 represents a laminated damper in accordance with the invention, having an internal flange body 11 and an external inertial body 21. The thin sheet metal lamins 40 are offset (in different degrees pair-wise) at their fastening margin 41, and are fastened together at their disk-like internal margin 42. The outermost lamin 48 simultaneously bears the bearing and sealing ring 60, which is attached to it by vulcanization, for example, which in this case consists of a conical portion and a disk-like prolongation in the axial direction, and which on the other side lies within the overlapping sheet metal cap 30. In the left half of the drawing there is shown another embodiment in which the outermost lamin 49 is present in only a fragmentary manner as the bearer of the bearing and sealing ring 61. The inertial body 21 consists in this example of a plurality of plates and, in the vicinity of its outside diameter, of the lamins 43 which, together with the lamins 40 of the flange body, form a sufficiently great number of discoidal interstices 51 of which only twelve are represented in this drawing. The individual parts of the inertial body 21 are closed off at their outside diameter by the ring 22 which serves not only for the centering of these parts, but also for the avoidance of a great number of seals between the lamins, since it necessitates only two solid seals 80 or 81 adjacent the face side.

Figure 3:
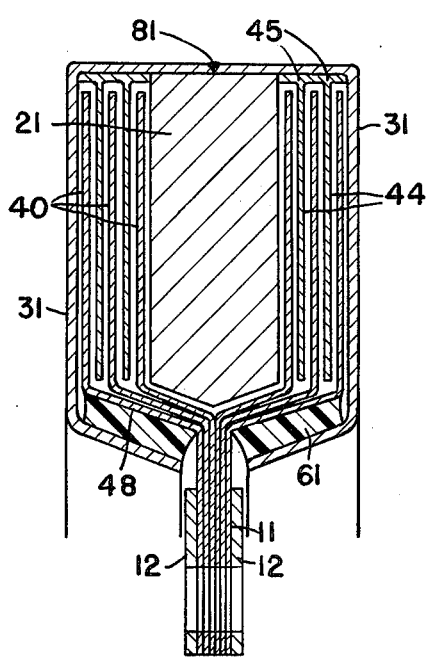
FIG. 3 shows a similar damper in which the overreaching sheet metal caps are membrane-like at their lateral faces.

FIG. 3 represents another embodiment of the laminated damper in which the flange body 11 also consists of lamins 40 offset in different degrees pair-wise, the outer ones of which have on their conical portion 48 the broad bearing and sealing rings 61. The discoidal inner portion of the flange body 11, which consists of the assembled lamins and serves for mounting the damper on the crankshaft, which is not shown, is here reinforced by two annular plates 12. The inertial body 21 consists in this embodiment of only a single massive ring bering two overreaching sheet metal caps 31 which receive at their inside diameter the bearing and sealing rings 61 and at their outside diameter cylindrically overreach the inertial body to the center thereof. This embodiment requires only one seal or weld 81 along the center plane of the damper. Due to the resilience of the bearing and corresponding dimensioning of the caps 31, the latter are able to yield slightly to both sides in the manner of membranes when internal pressure occurs. The lamins 44 on the inertial body are turned at the margin whereby they are fastened, the cylindrical projection 45 on the outside diameter serving both for the setting of the precise spacing in relation to the inertial body 21 or to the adjacent lamin, and for the centering and fastening of said lamins 44 within the cylindrical portion of the cap.

Figure 4:
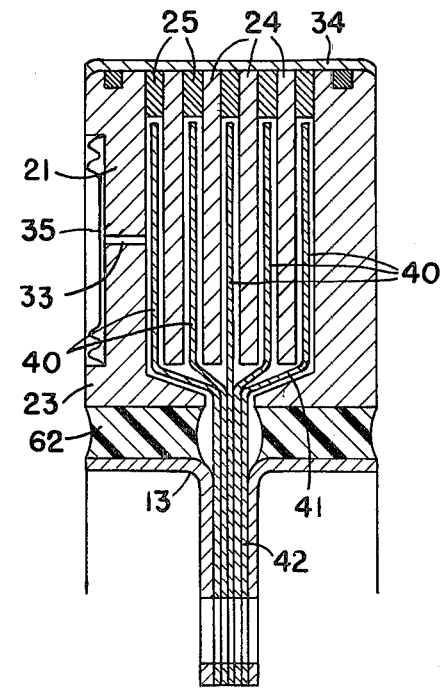
FIG. 4 shows an embodiment in which the damper plates are held together by an overlapping sheet metal cap and have a sheet metal membrane disposed on one side.

In another embodiment shown in FIG. 4, the broad bearing and sealing rings 62, here cylindrical, are attached at their inside diameter to the correspondingly shaped portion 13 of the flange body and directly bear on their outside diameter the correspondingly broadened outside plate 23 of the inertial body 21, which is composed in its central portion of numerous plates 24 with the spacing rings 25. These plates form, with the lamins 40, which again are offset at 41 and bound together at 42, the necessary interstitial spaces. The pressure compensation in this case is provided for by the annular sheet metal membrane 35 on the face side of the inertial body 21, whose inside is in communication with the interstitial spaced through the bore 33. The circular parts 23, 24 and 25 of the inertial body 21 are in this embodiment centered and held together by the overlapping sheet metal cap 34, which permits simple manufacture and sealing.

Figure 5:
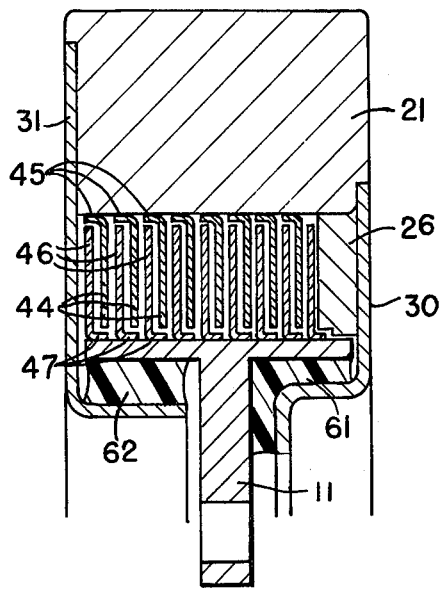
FIG. 5 shows an embodiment having similar lamins disposed in an annular chamber between the flange body and the inertial body.

In FIGS. 5 to 9, examples of another embodiment are described, in which the lamins are disposed in an annular chamber between the flange body and the inertial body, the lamins 46 mounted on the flange body being alike, and the lamins 44 inserted in the inertial body 21 being also alike. The cup-like bends forming each fastening margin 45 and 47 give the thin lamins stability of shape, assure their correct spacing, and serve for mounting with a good thermal gradient. In FIG. 5, the bearing and sealing rings 61 are fastened to the inertial body 21 by the sheet metal cap 30, in a manner similar to that described in FIG. 2. On the left side is shown a similar arrangement with a cylindrical bearing and sealing ring 62 joined to the inertial body 21 by the overlapping margin of cap 31, which again is of membrane-like construction. The additional inertial mass 26 fastened to the inertial mass 21 serves to fill out any remaining space if the number of pairs of lamims 44 and 46 does not, in a particular application, fill out the available width.

Figure 6:
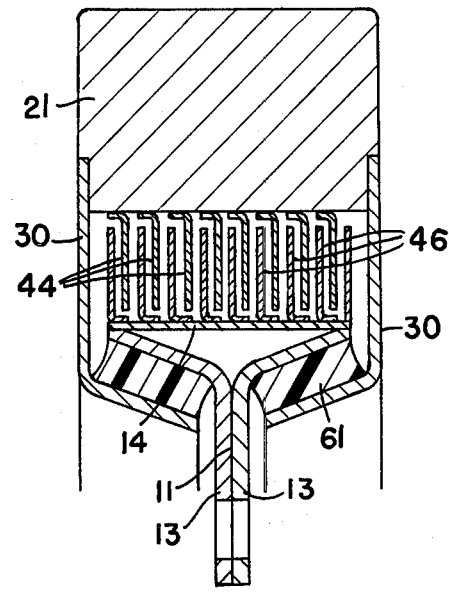
FIG. 6 shows a similar arrangement in which, however, the resilient bearing and sealing rings are disposed between truncoconical surfaces.

FIG. 6 shows a similar embodiment, in which, however, the flange body 11 consists of the two flange halves 13 which are spanned at their outside diameter by the cylindrical ring 14, which in turn bears the lamins 46. The bearing and sealing rings are here disposed between conical surfaces and on the inertial body side they are again held by the caps 30.

Figure 7:
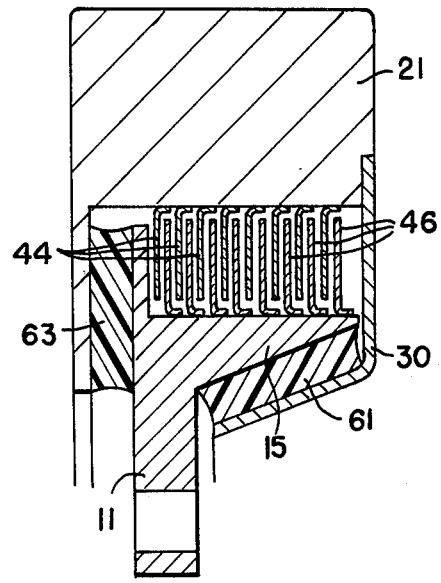
FIG. 7 shows a ring between radial surfaces in an asymmetrical damper embodiment.
Figure 8:
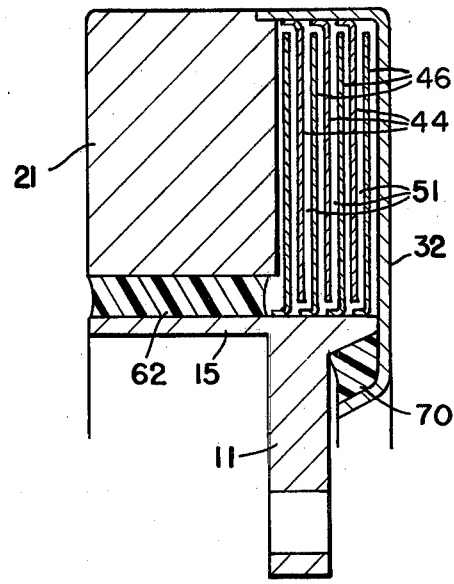
FIG. 8 shows an embodiment in which the asymmetrical bearing ring is mounted on an outside diameter of the bearing flange while the other serves virtually naught but sealing purposes.

FIG. 7 shows an asymmetrical embodiment of the flange 11, which has a rim 15 on one side as the lamin holder and bearing ring holder. The second bearing and sealing ring 63 is in this case disposed between radial surfaces of the flange body 11 and inertial body 21, and here serves, in conjunction with the resilient bearing and sealing ring 61, especially for the accommodation of axial forces.

FIG. 8 again shows non-symmetrical damper construction having a simple flange body 11 on whose raised rim 15 the broad sealing and guiding ring 62 is mounted, which directly bears the inertial body 21. The interstices 51 formed by the lamin pairs 44 and 46 are closed by the over-reaching cap 32 which again can be of a resilient, membrane-like construction bearing the resilient sealing ring 70 at its internal diameter.

Figure 9:
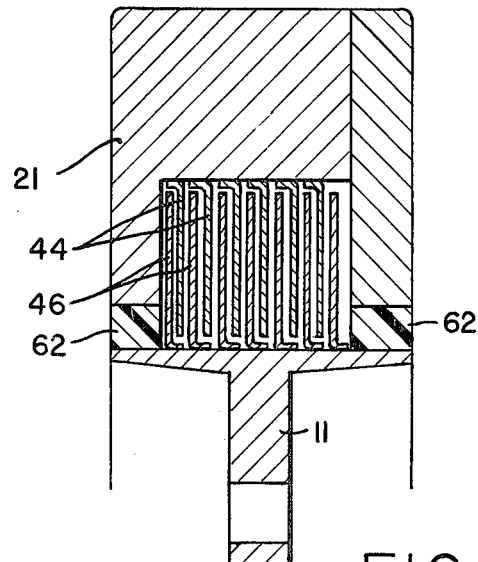
FIG. 9 shows a similar embodiment, but one having two symmetrically disposed bearing rings.

FIG. 9, finally, shows a symmetrically constructed damper in which the T-shaped flange body 11 bears the cylindrical bearing and sealing rings 62 on which the inertial body 21, which in this case is in two parts, is mounted.

Figure 10:
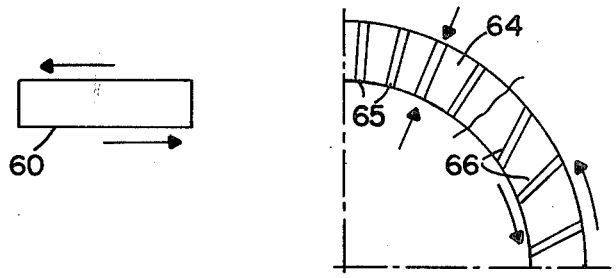
FIGS. 10 and 11 represent examples of the anisotropic design of the bearing and sealing rings having a stiffening effect in the case of radial and axial stresses.
Figure 11:
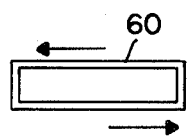
Figure 11:
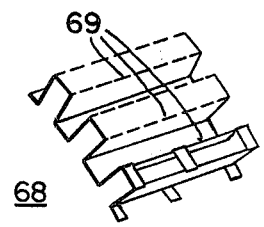

In the last two FIGS. 10 and 11, the anisotropic construction of the bearing and sealing rings is represented by way of example. In FIG. 10, the end view of the ring 64 shows the narrow, radially extending layers of harder material 65 which in the cross-section 60 extend over the entire surface. The layers of harder material, which can also consist of rubber types of greater hardness, tilt slightly 66 upon the occurrence of shear forces in the circumferential direction, which, at the small angles of inclination of a few degrees which occur here, does not impair the resilience in the circumferential direction. On the other hand, the stiffening by such layers or inserts is clearly recognizable, which is produced in the axial direction and in the radial direction in the event of a stress indicated by arrows in FIG. 10.

In FIG. 11 there is shown an embodiment of the radially disposed inserts, in which the latter, for reasons of manufacture, are held together in a band 67 of a meander-like configuration preferably of sheet steel. To prevent any stiffening from occurring in the circumferential direction upon deformation by shearing forces, the axially extending bends 69 are weakened and/or in the form of scoring for breakage at which the band breaks open during operation.

I claim:

1. Torsional vibration damper comprising an internal flange body, an external inertial body, the flange body and the inertial body having a plurality of intermeshing damper disks fastened thereto along a margin and defining therebetween interstitial spaces each having a given breadth, a highly viscous liquid filling the interstitial spaces, means sealing the space comprising resilient material comprising at least two resilient bearing and sealing rings of approximately rectangular cross section disposed between the flange body and the inertial body, wherein the rings are constructed anisotropically such that they behave softly with respect to shearing forces in the circumferential direction and stiffly in the radial and axial directions for the accommodation of bearing forces, and reinforcements vulcanized into the rings comprising a meander-shaped sheet steel band with weakened bends, wherein the damper disks of the flange body and the inertial body comprise cup-like lamins which are offset at the fastening margin thereof in accordance with the desired spacing therebetween and an annular chamber between said flange body and said inertial body and in which the lamins are disposed defining the interstitial spaces therebetween, the lamins fastened to the flange body, and the lamins fastened to the inertial body being identical, in construction.

2. Torsional vibration damper of claim 1, wherein the thickness of the lamins is at most five times the interstice breadth.

3. Torsional vibration damper of claim 2, wherein the thickness of the lamins is approximately twice the interstice breadth.

4. Torsional vibration damper of claim 1, wherein the lamins are pressed in one piece from sheet metal.

5. Torsional vibration damper of claim 1, wherein the inertial body comprises overreaching sheet metal caps on the inertial body which rest on the bearing and sealing rings.

6. Torsional vibration damper of claim 5 wherein the overreaching sheet metal caps are dimensioned and constructed in a membrane-like manner at their faces.

7. Torsional vibration damper of claim 1, wherein the rings extend over the entire structurally available width.

8. Torsional vibration damper of claim 1, wherein the rings are disposed between axial surfaces.

9. Torsional vibration damper of claim 1, wherein the rings are disposed between conical surfaces.

10. Torsional vibration damper of claim 1, wherein the rings are symmetrical with a central plane of the damper.

11. Torsional vibration damper of claim 1, wherein substantially only one ring accommodates bearing forces while the other has only sealing functions and consists of more resilient material.

12. Torsional vibration damper of claim 1, wherein the rings are composed of layers of different hardness, the interfaces lying in radial planes containing the central axis of the damper.

13. Torsional vibration damper of claim 1, wherein the rings are composed of rubber types of different elasticity.

* * * * *